(No Model.)

G. A. BATES.
ADJUSTABLE REAMER.

No. 262,348. Patented Aug. 8, 1882.

Witnesses.
L. H. Gager
Edwin F. Dimock.

Inventor.
George A. Bates
by Theo. G. Ellis, Attorney

UNITED STATES PATENT OFFICE.

GEORGE A. BATES, OF HARTFORD, CONNECTICUT, ASSIGNOR TO HIMSELF AND OSCAR B. PURINTON, OF SAME PLACE.

ADJUSTABLE REAMER.

SPECIFICATION forming part of Letters Patent No. 262,348, dated August 8, 1882.

Application filed October 8, 1881. (No model.)

*To all whom it may concern:*

Be it known that I, GEORGE A. BATES, of Hartford, in the county of Hartford and State of Connecticut, have invented certain new and useful Improvements in Adjustable Reamers; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to adjustable or expanding reamers which are intended to be used for the purpose of smoothing, finishing, and making to an exact gage a circular hole previously bored in a piece of metal..

The object of my invention is to provide a tool which is better adapted for the purpose than has heretofore been in use.

Figure 1:
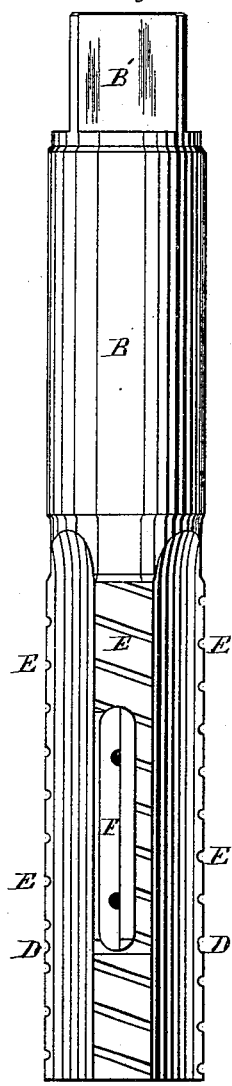
Figure 2:
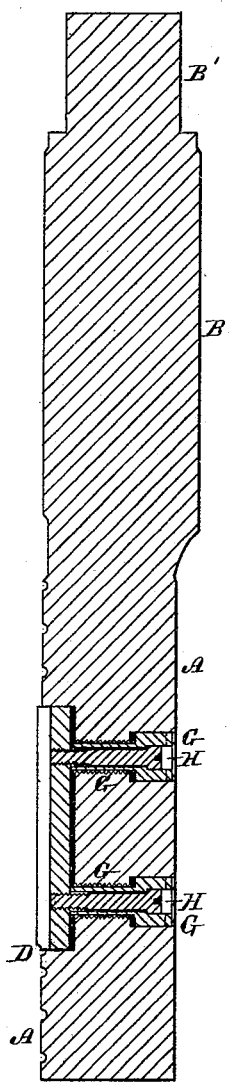
Figure 3:
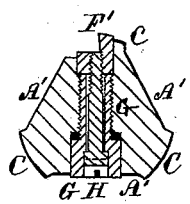

In the accompanying drawings, illustrating my invention, Figure 1 is a side view of my improved reamer, showing the cutting-edge. Fig. 2 is a longitudinal section through the middle, showing the method of attaching and operating the cutter. Fig. 3 is a cross-section of the reamer through one set of the screws for adjusting the cutter.

A is the body of the reamer. It is turned of a cylindrical form, and is furnished in the customary manner with a shank, B, and square B'. The sides of the body A are cut away on three sides at A', leaving three faces, C, of the original cylindrical circumference. In one of these faces the cutter is set.

D is a circular groove passing around through the three faces C. Below this groove the faces C are ground to a somewhat smaller diameter—in practice a few thousandths of an inch—so as to enter the hole to be reamed freely. The groove D furnishes the limit for this grinding without forming a shoulder.

E E are left-hand spiral grooves around the faces C, serving the purpose of making the faces run freer in the hole. The spiral is cut before the parts A' are cut away.

F is the cutter. It lies in a socket in one of the faces C, and it is firmly held and supported by the adjusting-screws G and H. There are two sets of these screws, one set at or near each end of the cutter F.

G is a hollow screw, with the thread on its exterior surface working in a hollow thread in the body A. The inner end of the screw presses against the under side of the cutter.

H is a screw passing through the screw G, having its head resting in a socket in the head of G, and furnished with a thread which screws into the body of the cutter. This screw holds the cutter firmly against the end of the screw G when turned into a bearing. The position of the cutter is fixed by the screw G, and the screw H holds the cutter down in place.

The edge of the cutter F' is intended to be set just outside of the face C, so as to cut away a small amount of metal outside of the size of the original hole. The lower part of the edge of the cutter for about one-third (more or less) of its length is slightly relieved or tapered inward for facilitating its entrance into the hole already bored.

The operation of my invention is as follows: When the reamer is introduced into the hole to be finished the two sides C C which are not furnished with the cutter take a bearing against the inside of the hole and hold the cutting-edge firmly to its work, and, the bearing being thus at three points only in the circumference, no wabbling or side movement can occur, and a true circular hole is produced.

When the cutter becomes in the least worn, so as not to cut so large a hole, the cutter can be set out and adjusted to the exact gage desired by means of the screws G G and H H, so that by this means my improved reamer can always be of perfect size until it is entirely worn out in its working parts. It can be sharpened, if desired, and still be used to the same gage.

What I claim as my invention is—

1. A reamer provided with two bearing-surfaces and one cutting-edge, arranged in a triangular position around the body of the reamer, substantially as described.

2. In combination with the body A of a reamer and the adjustable cutter F, the concentric adjusting-screws G H, arranged to act between the body and cutter, substantially as described.

GEORGE A. BATES.

Witnesses:
OSCAR B. PURINTON,
THEO. G. ELLIS.